(12) United States Patent
Niki et al.

(10) Patent No.: US 6,213,156 B1
(45) Date of Patent: Apr. 10, 2001

(54) HOSE FOR REFRIGERANT FOR AN ELECTRICALLY DRIVEN COMPRESSOR

(75) Inventors: Nobuaki Niki, Inuyama; Norihiko Furuta, Komaki, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/461,716

(22) Filed: Dec. 16, 1999

(30) Foreign Application Priority Data

Dec. 16, 1998 (JP) .................................................. 10-357188

(51) Int. Cl.$^7$ ...................................................... F16L 11/08
(52) U.S. Cl. ........................ 138/126; 125/137; 125/141; 125/DIG. 10
(58) Field of Search ..................... 138/137, 141, 138/140, 125, 126, DIG. 1, DIG. 10, DIG. 7

(56) References Cited

U.S. PATENT DOCUMENTS

| | | | |
|---|---|---|---|
| 3,614,967 | * 10/1971 | Royston | 138/149 |
| 4,510,974 | 4/1985 | Natori et al. | 138/137 |
| 4,905,736 | 3/1990 | Kitami et al. | 138/137 |
| 5,271,977 | 12/1993 | Yoshikawa et al. | 428/35.9 |
| 5,362,530 | 11/1994 | Kitami et al. | 428/36.2 |
| 5,476,121 | * 12/1995 | Yoshikawa et al. | 138/143 X |
| 5,488,975 | * 2/1996 | Chiles et al. | 138/137 X |
| 5,622,210 | * 4/1997 | Crisman et al. | 138/140 X |
| 5,839,478 | * 11/1998 | Colcombet et al. | 138/140 X |
| 6,074,717 | * 6/2000 | Little et al. | 138/143 X |

FOREIGN PATENT DOCUMENTS

| | | | |
|---|---|---|---|
| 03255288 | 11/1991 | (JP) . | |
| 04131233 | 5/1992 | (JP) . | |
| 2589238 | 3/1993 | (JP) | F16L/11/08 |
| 10-252955 | 9/1998 | (JP) | F16L/11/08 |
| 11264488 | 9/1999 | (JP) . | |

* cited by examiner

*Primary Examiner*—Patrick Brinson
(74) *Attorney, Agent, or Firm*—Jacobson, Price, Holman & Stern, PLLC

(57) ABSTRACT

A hose for conveying a refrigerant to an electrically driven compressor in an automobile air conditioner has a wall formed by at least an innermost thin resin layer and a laminated layer including a metallic foil or a metallic layer formed by vapor deposition. It is excellent in electric insulation, refrigerant resistance, waterproofness and vibration resistance.

20 Claims, 3 Drawing Sheets

FIG.1        PRIOR ART
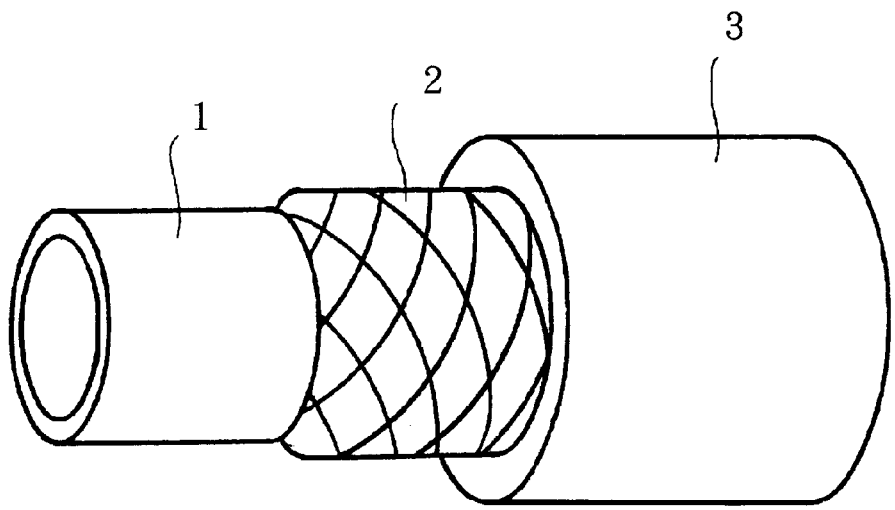
FIG.2
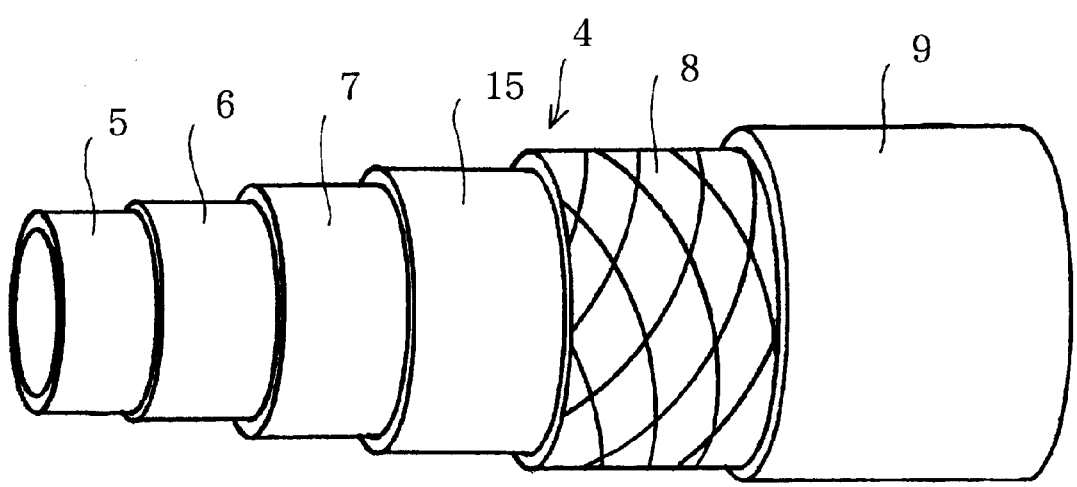

HOSE FOR REFRIGERANT FOR AN ELECTRICALLY DRIVEN COMPRESSOR

BACKGROUND OF THE INVENTION

1. Field of the Invention

This invention relates to a hose used for conveying a refrigerant containing an ester oil, or a similar electrically insulating oil, as a refrigerator oil (lubricant) to an electrically driven compressor. This invention is suitable for use with, among others, an electrically driven compressor in an automobile air conditioner.

2. Description of the Related Art

FIG. 1 shows by way of example a hose which has hitherto been used for transporting a refrigerant to an engine driven compressor in an automobile air conditioner. It comprises an inner tube 1 of rubber, such as IIR (butyl rubber), a reinforcing layer 2 formed by e.g. braided fiber and an outer tube 3 of rubber, such as EPDM (ethylene-propylene-diene rubber). This structure has been employed to give the hose resistance to vibration, and resistance and impermeability to a refrigerant composed of a refrigerator oil of the PAG (polyalkylene glycol) type and a flon (e.g. Freon) substitute, such as HFC (hydrofluorocarbon).

A hybrid car driven by both a gasoline engine and an electric motor, and an economical car having a gasoline engine adapted to stop instead of idling are being developed for practical use to avoid the global environmental problems caused by the massive consumption of gasoline. In either event, the air conditioner which can be employed is of the type in which an electrically driven compressor is employed instead of an engine driven one which does not work if the engine is stopped.

An electrically driven compressor is required to have a high degree of electric insulation, since a motor is installed in a refrigerator. Accordingly, it is necessary to change the refrigerator oil of the PAG type to an ester oil, such as POE (polyol ester), having a high degree of electrically insulating property. It is necessary to ensure a high degree of waterproofness against an external source in order to maintain the high electric insulation of the compressor and avoid the hydrolysis of the ester oil.

It has, however, been a drawback of the hose as shown in FIG. 1 that the IIR forming the inner tube 1 is likely to swell easily with an insulating oil, such as an ester oil, and cannot be expected to be satisfactorily resistant or impermeable to any refrigerant for an electrically driven compressor. It has been another drawback thereof that the hose as a whole is not so designed as to be highly waterproof, but fails to resist any invasion of water through its wall from an external source satisfactorily.

Although no such problem may arise from a metal pipe used for transporting a refrigerant to an electrically driven compressor in a cabinet refrigerator, etc., it is impossible to use a metal pipe for transporting a refrigerant to a compressor in an automobile air conditioner, since a metal pipe is too rigid to withstand vibration of the moving automobile, or its engine.

SUMMARY OF THE INVENTION

It is, therefore, an object of this invention to provide a hose for transporting a refrigerant to an electrically driven compressor which is highly permeation resistant to an electrically insulating oil, and highly waterproof, unlike the known hose as described above, and is vibration resistant so that it is particularly suitable for practical use in an automobile air conditioner.

This object is essentially attained by a hose for transporting a refrigerant containing an electrically insulating oil as a refrigerator oil to an electrically driven compressor, the hose having a wall comprising at least:

(1) a thin resin layer forming its innermost layer; and (2) a laminated layer including a metallic foil, or a metallic layer formed by vapor deposition.

The above and other objects and advantages of the invention will become more apparent from the following description and the accompanying drawings.

BRIEF DESCRIPTION OF THE DRAWINGS

FIG. 1 is a partly cutaway perspective view of a known hose for transporting a refrigerant to an engine driven compressor;

FIG. 2 is a partly cutaway perspective view of a hose according to a first preferred embodiment of this invention for transporting a refrigerant to an electrically driven compressor;

DETAILED DESCRIPTION OF THE INVENTION

Figure 3A:
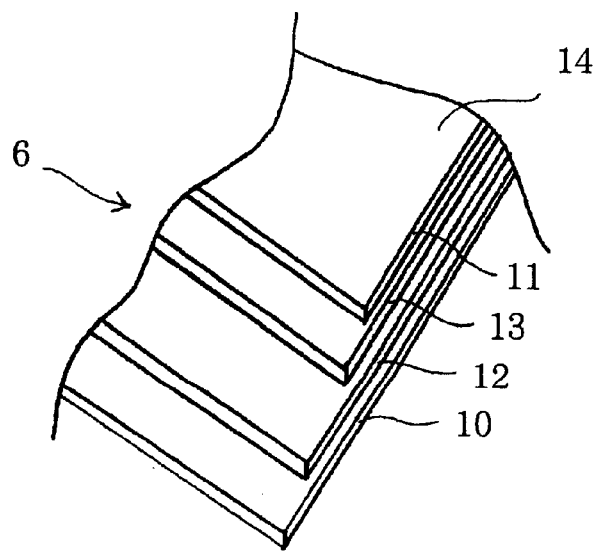
FIG. 3A is a perspective view of the hose shown in FIG. 2 partly cutaway to show each laminated layer in the wall.

According to a first aspect of this invention, there is provided a hose for transporting a refrigerant containing an electrically insulating oil as a refrigerator oil to an electrically driven compressor, the hose having a wall comprising:

(1) a thin resin layer forming its innermost layer; and (2) a laminated layer including a metallic foil, or a metallic layer formed by vapor deposition.

The innermost thin resin layer is highly resistant and impermeable to an electrically insulating oil, such as an ester oil (and HFC), and makes the hose of this invention suitable as a hose for transporting a refrigerant containing an electrically insulating oil as a refrigerator oil to an electrically driven compressor. The laminated layer including a metallic foil, or a metallic layer formed by vapor deposition (preferably a metallic foil) makes the hose highly waterproof and prevents any invasion through its wall of water from an external source. Thus, the use of the hose according to this invention makes it possible to ensure the high electrically insulating property of an electrically driven compressor, and also to effectively avoid the hydrolysis of an ester-type oil, if used. Unlike a rigid metal pipe, the hose having a wall comprising a thin resin layer and a laminated layer as described above is satisfactorily flexible for use with an electrically driven compressor in an automobile air conditioner despite the vibration of the moving automobile and its engine.

According to a second aspect of this invention, there is provided a hose in which the thin resin layer in the wall of the hose according to the first aspect thereof is a product of extrusion molding. This is an advantageous method of forming the innermost resin layer. A thin resin layer having an appropriate thickness is easy to form by extrusion onto, for example, a rubber or resin mandrel, and an outer layer, such as of rubber, is also easy to form by extrusion molding simultaneously or sequentially.

According to a third aspect of this invention, there is provided a hose in which the resin layer according to the first or second aspect thereof has a thickness not exceeding 200 microns. The resin layer having a thickness not exceeding 200 microns ensures the high flexibility of the hose despite its wall being composed of the resin and laminated layers.

According to a fourth aspect of this invention, there is provided a hose in which the laminated layer according to any of the first to third aspects thereof comprises a helically wound, or longitudinally lapped tape of a laminated sheet prepared by laying a resin film on any of the following:

(a) a metallic foil;

(b) a metallic foil and a reinforcing material; and (c) a metallic layer formed by vapor deposition. The resin film in the laminated layer protects the metallic foil, etc. effectively from being damaged or broken by fatigue, even if the hose may be bent or deformed, so that the hose may remain highly waterproof for a long time. The helically wound, or longitudinally lapped tape makes the laminated layer very easy to form on the hose which is a cylindrical body. The reinforcing material used with the foil as in (b) above has a sufficiently high stretch resistance for protecting the foil from being broken, even if a stretching or bending force which is stronger than what can be overcome by the resin film may act upon the wall of the hose. The metallic layer formed by vapor deposition as in (c) above is effective for preventing any sudden reduction in water proofness of the wall of the hose when the wall is stretched or bent by a very strong force unless the laminated sheet as a whole is broken, since the layer formed by vapor deposition is not broken by stretching.

According to a fifth aspect of this invention, there is provided a hose in which the helically wound, or longitudinally lapped tape according to the fourth aspect thereof has its edge portions overlapping each other and bonded to each other. The overlapping edge portions of the laminated layer bonded to each other give it a still higher level of water tightness.

According to a sixth aspect of this invention, there is provided a hose in which the laminated layer according to any of the first to fifth aspects thereof is surrounded by a reinforcing layer formed by braiding reinforcing fiber or wire, and an outer layer of an appropriate rubber. The reinforcing layer surrounding the laminated layer improves the strength of the hose as a whole against bursting, breaking or stretching, while giving a greater protection to the laminated layer. The outer layer is effective for protecting the radially inward reinforcing and laminated layers against deterioration by environmental factors, such as weather, heat, rainwater, chemicals and oils.

According to a seventh aspect of this invention, there is provided a hose including an intermediate layer of rubber formed between the thin resin layer and the laminated layer according to any of the first to fifth aspects of this invention, or between the laminated and reinforcing layers according to the sixth aspect thereof. The intermediate layer of rubber protects the laminated layer against any undesirable wrinkling or bending without lowering the flexibility of the hose (or its vibration resistance) to any undesirable extent, and improves the adherence of the thin resin, or reinforcing layer to the laminated layer and thereby the durability of the hose. The intermediate layer is effective for protecting the laminated layer, or its metallic foil, etc. from being damaged or broken, particularly when it is formed between the thin resin and laminated layers.

Description will now be made in further detail of this invention and the first to seventh aspects thereof.

Use of the Hose

The refrigerant hose of this invention can be used without any limitation for transporting a refrigerant containing an ester oil, or a similar electrically insulating oil as a refrigerator oil (or lubricant) to any electrically driven compressor. Typical examples of its use include its use with an electrically driven compressor in an automobile air conditioner, an ordinary cabinet refrigerator and a household air conditioner, but the most preferable use thereof is its use with an electrically driven compressor in an automobile air conditioner which requires an electrically insulating hose having a high resistance to an ester oil, or like oil, and a high flexibility (or vibration resistance).

Overall Construction of the Hose

The hose of this invention has a wall comprising (1) a thin resin layer forming its innermost layer and (2) a laminated layer including a metallic foil, or a metallic layer formed by vapor deposition. The hose may further include in its wall another component or layer surrounding its thin resin layer, or surrounded by or surrounding its laminated layer. Typical examples of such variations include a hose according to the sixth aspect of this invention having a reinforcing layer, or an outer layer of rubber, or both, and a hose according to the seventh aspect of this invention having an intermediate layer of rubber formed between the thin resin and laminated layers, or between the laminated and reinforcing layers.

Thin Resin Layer

The thin resin layer forms the innermost layer of the wall of the hose according to this invention. It can be formed by any appropriate method, but is preferably formed by extrusion molding, since it is an easy process, as stated before. The layer may be of any resin, since a resin layer is generally highly permeation resistant to an ester, or a similar electrically insulating oil, or an HFC refrigerant, as compared with rubber, etc., even if it may be of small thickness.

Thin Resin Layer Formed by Extrusion Molding

The resin layer formed by extrusion molding is, however, preferably of, for example, a polyamide resin such as nylon 6, nylon 66, nylon 12 or a copolymer thereof, a blended resin containing a polyamide resin, or an ethylene-vinyl alcohol copolymer resin, as every such resin is highly resistant and impermeable to an electrically insulating oil, or an HFC refrigerant.

A particularly preferable material for the layer is a blended polyamide and modified polyolefin resin which is highly flexible, while being highly resistant and impermeable to an electrically insulating oil, or an HFC refrigerant. More specific examples include a blended product obtained by blending appropriate proportions of a modified polyolefin, such as a graft polymer prepared by the graft polymerization of a polyolefin consisting basically of ethylene and/or propylene, with an unsaturated carboxylic acid or a derivative thereof, and a polyamide resin, such as nylon 6, nylon 66, nylon 12 or a copolymer thereof.

The resin and laminated layers may directly adjoin each other, or may be bonded to each other by a thin thermoplastic resin film heated therebetween, but it is usually advisable to form an intermediate layer of rubber therebetween, as stated below.

If the resin layer is of a blended polyamide and modified polyolefin resin, an intermediate layer of rubber surrounding it is preferably of rubber not having any polar functional group, e.g. IIR, a halogenated IIR such as Cl- or Br-IIR, ethylene-propylene rubber (EPM), or EPDM, while the blended resin preferably contains 1 to 10% by weight of ε-caprolactam having a good affinity for the rubber, and the resin and rubber layers are preferably bonded to each other by e.g. a chlorinated rubber adhesive or a phenolic adhesive, so that the two layers may maintain a greatly improved adherence to each other.

The resin layer may be of any thickness enabling the hose to be satisfactorily flexible, but preferably has a thickness not exceeding 200 microns, and more preferably not exceeding 100 microns. A resin layer having an extremely small thickness (for example, less than 50 microns) is often likely to lack uniformity in thickness, or even have a broken portion or portions.

Laminated Layer

The laminated layer may be of any construction if it includes a metallic foil, or a metallic layer formed by vapor deposition, but it is preferably composed of (a) a metallic foil, (b) a metallic foil and a reinforcing material, or (c) a metallic layer formed by vapor deposition, and a resin film laminated thereon.

The laminated layer is preferably formed by helically winding or longitudinally lapping a laminated sheet prepared in the form of a tape by laminating a resin film on any of the materials mentioned as (a) to (c) above. A helically wound layer is formed by winding a tape helically into a completely cylindrical shape with no gaps, and a longitudinally lapped layer is formed by using a tape having a width sufficiently large to encircle the inner layer, placing it in parallel to the longitudinal axis thereof and lapping it completely therearound to form a cylindrical shape.

The laminated sheet is usually prepared by fusing, or adhesively bonding a resin film onto both sides of any of the materials (a) to (c). A laminated sheet including (c), a metallic layer formed by vapor deposition, may be prepared either by forming a metallic layer on a resin film by vapor deposition, and fusing or bonding another resin film onto the metallic layer, or by forming a metallic layer on each of two resin films by vapor deposition, and fusing or bonding the metallic layers of the two films to each other.

The resin film may be of any resin, but is preferably of a thermoplastic resin, such as a polyamide (PA), polyethyleneterephthalate (PET), or ethylene-vinyl alcohol copolymer resin. There are no specific limits for rigidity or thickness, but preferably it has a flexural modulus of 1,000 to 100,000 kgf/cm$^2$ and a thickness of 5 to 100 microns.

The metallic foil and reinforcing material as in (b) above may or may not be bonded to each other, but are preferably bonded to each other, since the reinforcing material exhibits a greater reinforcing effect when bonded to the foil. The reinforcing material may be surround or be surrounded by the foil, but is more effective when surrounding the foil. The foil and reinforcing material may or may not be bonded to the resin film laid thereon.

Any material can be used as the reinforcing material if it exhibits a high stretch resistance, but it is preferable to use a material having a high flexibility, as well as a high stretch resistance. Examples of the preferred materials are a wire mesh, and a reinforcing fabric, such as canvas, or nonwoven fabric, preferably of aramid, carbon or glass fiber having a high stretch resistance, though a resin film of high strength can also be used.

The helically wound, or longitudinally lapped tape preferably has its edge portions overlap each other to ensure the water tightness of the laminated layer, and more preferably has its overlapping edge portions bonded to each other to ensure a still higher level of water tightness.

Other Components of the Hose

The refrigerant hose of this invention, which comprises the resin and laminated layers, may include an additional component layer or layers, as stated before. A few examples of additional layers will now be described.

A reinforcing layer may be formed to surround the laminated layer. The reinforcing layer is not specifically limited in construction, but may, for example, comprise a braided wire layer, a braided layer of reinforcing fibers, two spiral layers of reinforcing fibers wound spirally in opposite directions to each other, or two such spiral layers between which an intermediate layer of rubber is disposed. A braided layer of reinforcing fibers, such as aramid or polyester fibers, is preferred to ensure the flexibility of the hose.

An outer layer of rubber may be formed as the outermost layer of the wall of the hose. It may be of any rubber, but is preferably of e.g. chloroprene rubber (CR), butyl rubber (IIR), chlorosulfonated polyethylene rubber (CSM), or ethylene-propylene-diene rubber (EPDM), as every such rubber is of high weatherability.

An intermediate layer of rubber (a first intermediate layer of rubber) is preferably disposed between the resin and laminated layers. It is effective for, for example, improving the adhering contact between the resin and laminated layers and reducing the wrinkling or bending of the laminated layer to protect its foil, etc. from being damaged or broken. If a reinforcing layer is formed to surround the laminated layer, it is effective to form an intermediate layer of rubber (a second intermediate layer of rubber) therebetween. The second layer is also effective for e.g. protecting the laminated layer. The first and second intermediate layers may be of any rubber, but are preferably of, for example, IIR, nitrile rubber (NBR) or CSM, as every such rubber is high in refrigerant permeation resistance and flexibility.

DESCRIPTION OF THE PREFERRED EMBODIMENTS

The invention will now be described more specifically by a few preferred forms of its embodiment as shown in the drawings.

Preferred Embodiment 1

Figure 3B:
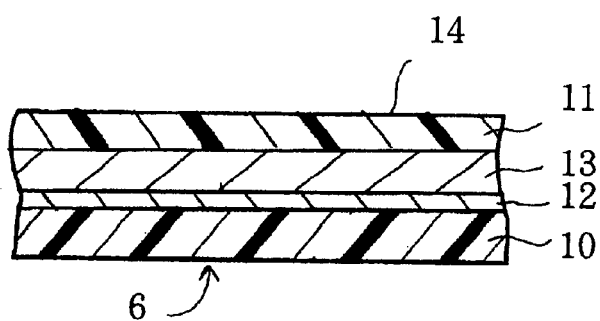
FIG. 3B is a cross sectional view of a part of the same laminated layer.

FIG. 2 shows a refrigerant hose 4 having a wall which comprises a thin resin layer 5 formed by extrusion molding and having a thickness of about 150 microns, a first intermediate layer 6 of butyl rubber, a laminated layer 7 which is shown in detail in FIGS. 3A and 3B, a second intermediate layer 15 of butyl rubber, a reinforcing layer 8 formed by braiding an appropriate kind of reinforcing fibers and an outer layer 9 consisting of CR, as viewed in the order of their appearance radially outwardly across the wall.

The laminated layer 7 is formed from a laminated sheet 14 prepared by sandwiching with an adhesive an aluminum foil 12 and a resin sheet used as a reinforcing material 13 between an inner resin layer 10 and an outer resin layer 11 each consisting of a thin film of thermoplastic PET, as shown in FIGS. 3A and 3B. The foil 12 is integrally bonded to the reinforcing material 13 by an adhesive not shown, and is held thereby so that no tension acting upon the laminated layer 7 may affect the foil 12. Although FIGS. 3A and 3B show the foil 12 surrounded by the reinforcing material 13, their positions can be reversed.

Figure 4:
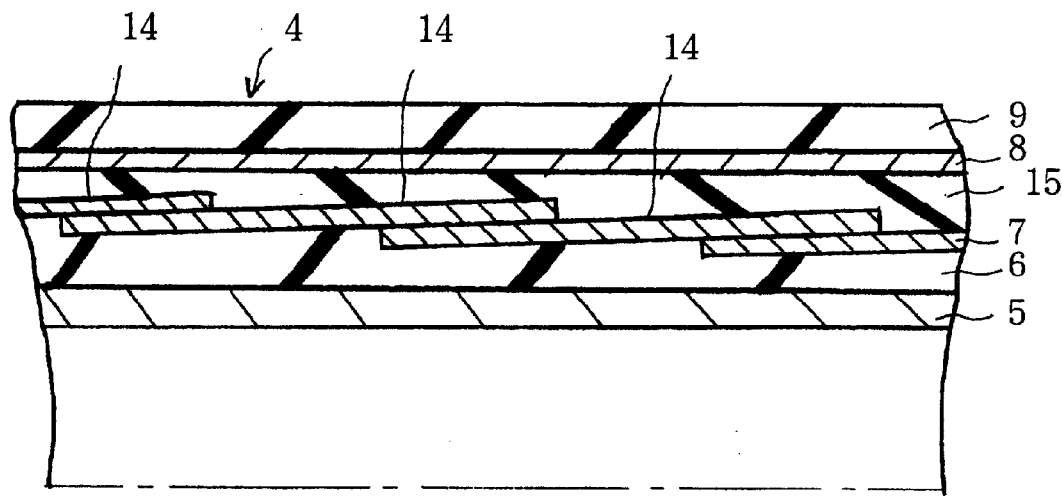
FIG. 4 is a partial longitudinal sectional view of the hose shown in FIG. 2.

The laminated layer 7 is formed by the laminated sheet 14 in the form of a tape wound helically about the first intermediate layer 6 of rubber, as shown in FIG. 4. The laminated sheet 14 has its edge portions overlap each other, and its overlapping portions are bonded to each other by an adhesive to ensure the permeation resistance of the wall of the hose against water, etc., coming from any external source.

Figure 5:
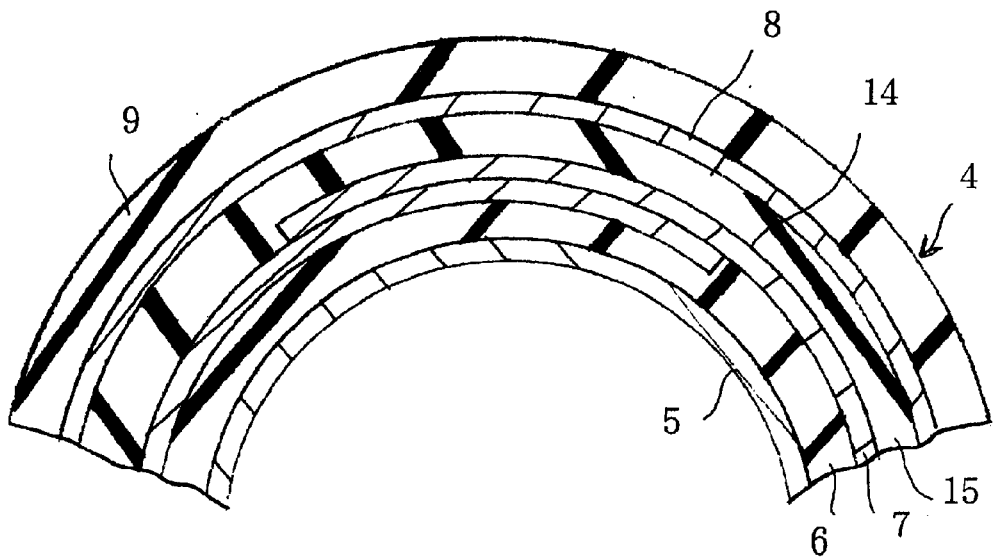
FIG. 5 is a partial transverse sectional view of the hose shown in FIG. 2.

A modified form of laminated layer 7 can be formed by applying a tape 14 longitudinally to the first intermediate layer 6 of rubber and lapping it thereabout, as shown in FIG. 5. The tape 14 has its edge portions overlap each other, and its overlapping portions are preferably bonded to each other by an adhesive.

Modified Embodiment 1

Figure 3C:
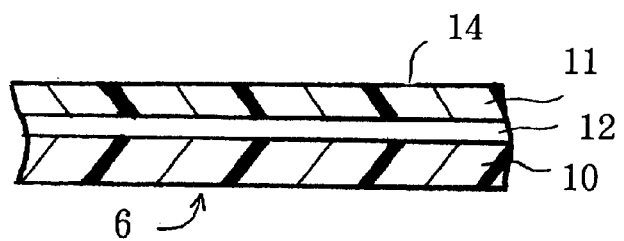
FIG. 3C is a view similar to FIG. 3B, but showing a modified form of the laminated layer.

The reinforcing material 13 may be excluded from the laminated sheet 14 forming the laminated layer 7, and the laminated sheet 14 may be composed of an inner resin layer 10, an outer resin layer 11 and a metallic foil 12 bonded therebetween, as shown in FIG. 3C.

Modified Embodiment 2

The first intermediate layer 6 of rubber may be excluded from the hose 4 shown in FIG. 2.

While the invention has been described by the preferred embodiments thereof, variations thereto will occur to those skilled in the art within the scope of the present inventive concepts which are delineated by the following claims.

What is claimed is:

1. A hose for transporting a refrigerant containing an electrically insulating oil as a refrigerator oil to an electrically driven compressor, the hose having a wall comprising:
   (1) a thin resin layer forming the innermost layer thereof;
   (2) a laminated layer including a metallic foil, or a metallic layer formed by vapor deposition; and
   (3) an intermediate layer of rubber between said resin and laminated layers.

2. A hose as set forth in claim 1, wherein said hose is a hose for an electrically driven compressor in an automobile air conditioner.

3. A hose as set forth in claim 1, wherein said resin layer is one formed by extrusion molding.

4. A hose as set forth in claim 3, wherein said resin layer is of a resin selected from among a polyamide resin, a blended resin containing a polyamide resin, and an ethylene-vinyl alcohol copolymer resin.

5. A hose as set forth in claim 3, wherein said resin layer is of a blended polyamide and modified polyolefin resin.

6. A hose as set forth in claim 1, wherein said resin and laminated layers are bonded to each other directly, or with a thin thermoplastic resin film held therebetween.

7. A hose as set forth in claim 1, wherein said resin layer is of a blend resin of polyamide and modified polyolefin, and said intermediate layer is of rubber selected from among butyl rubber, halogenated butyl rubber, ethylene-propylene rubber and ethylene-propylene-diene rubber.

8. A hose as set forth in claim 7, wherein said blended resin contains 1 to 10% by weight of $\epsilon$-caprolactam with respect to said blend resin.

9. A hose as set forth in claim 8, wherein said resin and intermediate layers are bonded to each other by a chlorinated rubber adhesive or a phenolic adhesive.

10. A hose as set forth in claim 1, wherein said resin layer has a thickness of 200 microns at the largest.

11. A hose for transporting a refrigerant containing an electrically insulating oil as a refrigerator oil to an electrically driven compressor, the hose having a wall comprising:
    (1) a thin resin layer forming the innermost layer thereof;
    (2) a laminated layer including a metallic foil, or a metallic layer formed by vapor deposition;

wherein said laminated layer is composed of a laminated sheet in the form of a tape prepared by laying a resin film on any of the following:
    (a) a metallic foil;
    (b) a metallic foil and a reinforcing material; and
    (c) a metallic layer formed by vapor deposition.

12. A hose as set forth in claim 11, wherein said laminated layer comprises said tape wound helically, or lapped longitudinally.

13. A hose as set forth in claim 12, wherein said tape has its edge portions overlapping each other and bonded to each other.

14. A hose as set forth in claim 1, wherein said wall further comprises a reinforcing layer formed by braiding reinforcing fiber or wire and surrounding said laminated layer, and an outer layer of rubber surrounding said reinforcing layer.

15. A hose for transporting a refrigerant containing an electrically insulating oil as a refrigerator oil to an electrically driven compressor, the hose having a wall comprising:
    (1) a thin resin layer forming the innermost layer thereof;
    (2) a laminated layer including a metallic foil, or a metallic layer formed by vapor deposition;
    (3) a reinforcing layer formed by braiding reinforcing fiber or wire and surrounding said laminated layer;
    (4) an outer layer of rubber surrounding said reinforcing layer; and
    (5) an intermediate layer of rubber between said laminated and reinforcing layers.

16. A hose as set forth in claim 1, wherein said intermediate layer is of rubber selected from among butyl rubber, nitrile rubber and chlorosulfonated polyethylene rubber.

17. A hose as set forth in claim 15, wherein said intermediate layer is of rubber selected from among butyl rubber, nitrile rubber and chlorosulfonated polyethylene rubber.

18. An automobile air conditioner having an electrically driven compressor comprising a hose as set forth in claim 1.

19. An automobile air conditioner having an electrically driven compressor comprising a hose as set forth in claim 11.

20. An automobile air conditioner having an electrically driven compressor comprising a hose as set forth in claim 15.

* * * * *